United States Patent Office 3,320,306
Patented May 16, 1967

3,320,306
PROCESS FOR THE PREPARATION OF 4-(2-METHYLENEALKANOYL)PHENOXY ALKANOIC ACIDS BY DECARBOXYLATION
John M. Chemerda, Plainfield, N.J., and John B. Bicking, Lansdale, Pa., assignors to Merck & Co., Inc., Rahway, N.J., a corporation of New Jersey
No Drawing. Filed Jan. 29, 1964, Ser. No. 341,131
7 Claims. (Cl. 260—520)

This invention relates to a novel method for the preparation of [4-(2-methylenealkanoyl)phenoxy]alkanoic acids, which compounds possess diuretic, natriuretic and chloruretic properties and are therefore useful in the treatment of many ailments resulting from an excessive retention of electrolytes, especially sodium, chloride or sodium and chloride ions. The products of the invention are particularly valuable in the treatment of hypertension, edema and other conditions associated with electrolyte and fluid retention.

The process of the invention comprises the decarboxylation of a [2-carboxy-4-(2-methylenealkanoyl)phenoxy]alkanoic acid to produce the corresponding [4-(2-methylenealkanoyl)phenoxy]alkanoic acid product. The following equation illustrates the reaction:

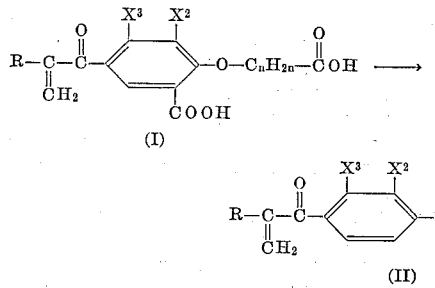

where R is a member selected from the group consisting of lower alkyl, e.g., methyl, ethyl, propyl, isopropyl, butyl, pentyl, etc., trihalomethyl substituted lower alkyl, e.g., 2,2,2-trifluoroethyl, 1-trifluoromethylethyl, etc., cycloalkyl, e.g., cycloalkyl containing from 3–6 nuclear carbon atoms, such as cyclopropyl, cyclopentyl, cyclohexyl, 4-methylcyclohexyl, etc.,

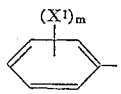

wherein $X^1$ is a member selected from the group consisting of hydrogen, halogen, lower alkyl and lower alkoxy and $m$ is an integer having a value of 1–4, and

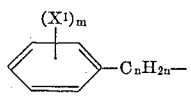

wherein the radicals $X^1$ and $m$ are as defined above, $X^2$ and $X^3$ each represents a member selected from the group consisting of hydrogen, halogen, lower alkyl, lower alkoxy and, taken together, the $X^2$ and $X^3$ radicals are combined to form a 1,3-butadienylene linkage (i.e., —CH=CH—CH=CH—)

and $n$, in each occurrence, is an integer having a value of 1–5.

Decarboxylation of the starting material (I) to the [4-(2-methylenealkanoyl)phenoxy]alkanoic acid (II) proceeds most advantageously by treating the former with hot diethyl succinate and boiling the mixture for a short interval. While we prefer to employ diethyl succinate as the decarboxylating medium it will be apparent to one skilled in the art that any other functionally equivalent reagent, for example, copper powder or copper chromite in a basic medium such as quinoline or quinaldine, may also be employed with good results.

The temperature at which the reaction is conducted is not a particularly critical aspect of the invention. In general, we have found that temperatures in the range of 180–300° C. facilitate the synthesis; however, one skilled in the art will readily perceive that within limits the reaction temperature may be varied to a greater or lesser degree to obtain the desired rate of reaction.

The [4-(2-methylenealkanoyl)phenoxy]acetic acid products produced by the process are generally obtained as crystalline solids and, if desired, may be purified by recrystallization from a solvent. Suitable solvents include, for example, methylcyclohexane, n-butyl chloride, carbon tetrachloride and a mixture of benzene and cyclohexane.

A preferred embodiment of the invention comprises the reaction of a [2-carboxy-4-(2-methylenealkanoyl)phenoxy]acetic acid with a decarboxylating agent according to the following equation:

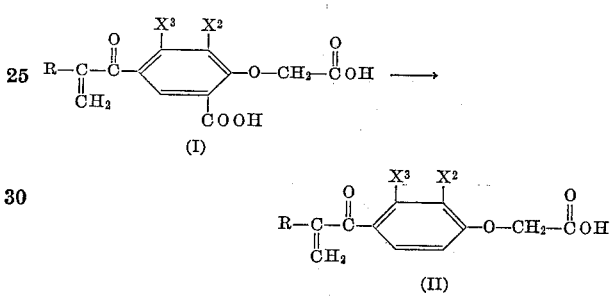

wherein R represents a member selected from the group consisting of lower alkyl and trihalomethyl substituted lower alkyl, e.g., 2,2,2-trifluoroethyl, 1-trifluoromethylethyl, etc., and $X^2$ and $X^3$ each represents a member selected from the group consisting of hydrogen, halogen, lower alkyl and, taken together, the $X^2$ and $X^3$ radicals are combined to form a 1,3-butadienylene linkage (i.e., —CH=CH—CH=CH—). The above-described class of compounds exhibit particularly good diuretic, natriuretic and chloruretic properties and are thus especially useful in the treatment of conditions associated with electrolyte and fluid retention.

The [2-carboxy-4-(2-methylenealkanoyl)phenoxy]alkanoic acids (I) employed as reactants in the process are prepared from known compounds according to the following equations:

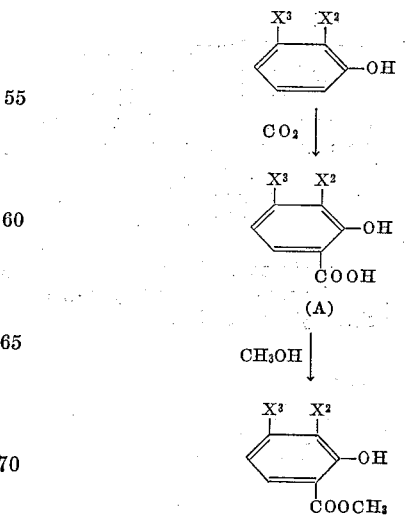

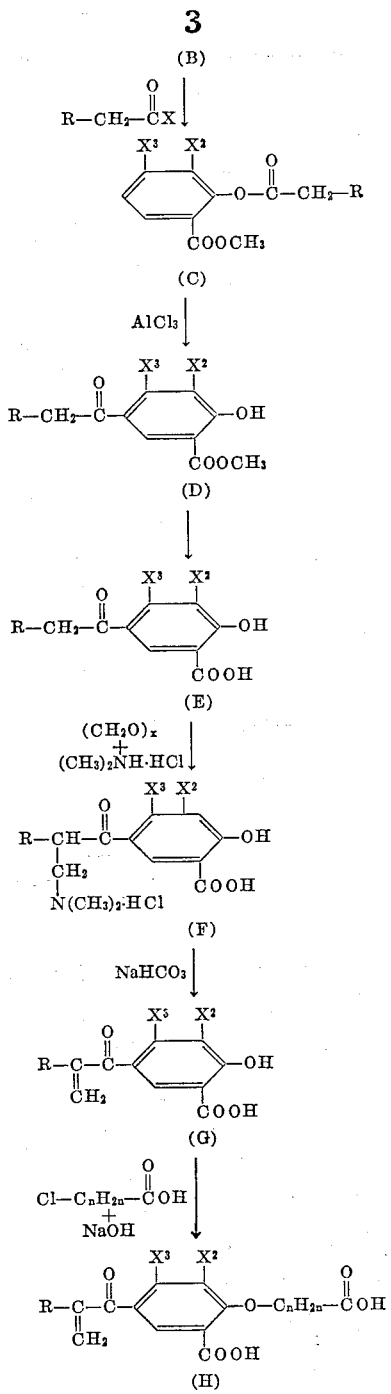

wherein the radical X represents halogen, e.g., chlorine, bromine, etc., $x$ is an integer having a value of 1 or a number greater than 1, and the radicals R, $X^2$, $X^3$ and $n$ are as defined above. Compound A in the above equation is synthesized by the reaction of phenol or an appropriate nuclear substituted phenol with carbon dioxide in the presence of sodium or potassium carbonate. The salicylic acid or nuclear substituted salicylic acid (A) thus produced is then esterified by conventional methods as, for example, by treating the said acid with a lower alkanol, such as methanol, and the resulting ester (B) is then treated with a suitable alkanoyl halide (i.e.,

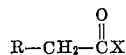

wherein X is halogen, e.g., chlorine, bromine, etc.) to obtain the corresponding 2-alkanoyloxybenzoic acid ester (C). Reaction of the said benzoic acid ester (C) with aluminum chloride results in a rearrangement of the said intermediate (C) to its 5-alkanoylsalicylate isomer (D) and the salicylate thus formed is hydrolyzed in a weakly basic solution to produce the corresponding 5-alkanoyl salicylic acid (E). The 5-alkanoylsalicylic acid is then converted to the 5-[(2-dimethylaminomethyl)alkanoyl] salicylic acid by treating the former with formaldehyde or paraformaldehyde in the presence of dimethylamine hydrochloride; and the Mannich amine thus prepared is converted to the corresponding 5-(2-methylenealkanoyl) salicylic acid (G) by treating the Mannich amine (F) with a weak base, e.g., sodium bicarbonate. Etherification of the said acid (G) with a suitable omega-haloalkanoic acid, e.g., omega-chloroalkanoic acid, in the presence of a weakly basic sodium hydroxide solution then produces the desired [2-carboxy-4-(2-methylenealkanoyl) phenoxy]alkanoic acid reactant (H). By following the above procedure all of the starting materials identified as planar formula I supra may be prepared.

This invention also relates to the acid addition salts of the [4-(2-methylenealkanoyl)phenoxy]alkanoic acids prepared by the instant process; which salts are produced by the reaction of the said acids with a base having a non-toxic pharmacologically acceptable cation. In general, any base which will form an acid addition salt with a carboxylic acid and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, e.g., piperidine, etc. The acid addition salts thus produced are the functional equivalent of the corresponding phenoxyacetic acids and one skilled in the art will appreciate that to the extent that the phenoxyalkanoic acids of the invention are useful in therapy, the variety of acid addition salts embraced by this invention is limited only by the criterion that the bases employed in forming the salts be both non-toxic and physiologically acceptable.

This invention also relates to the ester and amide derivatives of the instant carboxylic acids. These derivatives are prepared by conventional methods well-known to those skilled in the art; thus, for example, the said ester derivatives may be prepared by the reaction of the carboxylic acid product of the invention with an alcohol as, for example, with a lower alkyl alcohol to prepare the corresponding esterified derivative or, alternatively, converting the carboxylic acid product to its acid halide by conventional methods and treating the acid halide thus formed with the appropriate lower alkanol. Similarly, the amide derivatives of the instant carboxylic acids may be prepared by treating the acid halide of the instant acids with ammonia or an appropriate dialkylamine to produce the corresponding amide. Another process for preparing the said amide derivatives comprises the conversion of the acid products of the invention to their corresponding ester derivatives and treating the said ester with ammonia or an appropriate dialkylamine to produce the corresponding amide. The ester derivatives of the carboxylic acids of the invention may also be prepared inherently during the process by employing the ester analogs of the corresponding omega-haloalkanoic acid reactants described in the preparative methods discussed above. These and other equivalent methods for the preparation of the ester and amide derivatives of the instant carboxylic acids will be apparent to one having ordinary skill in the art and to the extent that the said derivatives are both non-toxic and physiologically acceptable to the body system the said esters and amides are the functional equivalent of the corresponding carboxylic acid products.

The following examples are illustrative of the process of the invention; however, the examples are illustrative only and the invention is not to be construed as being limited thereto.

EXAMPLE 1

[3-methyl-4-(2-methylenebutyryl)phenoxy]acetic acid

STEP A.—4-METHYLSALICYLIC ACID

A mixture of 81 g. (0.75 mole) of m-cresol, 207 g. of potassium carbonate and 80 g. of Dry Ice was sealed in an autoclave and heated at 180° C. for 12 hours. The autoclave was cooled and opened. The solid contents were dissolved in boiling water, the solution treated with charcoal, filtered and acidified to precipitate 65 g. of 4-methylsalicylic acid, M.P. 173–176° C.

STEP B.—METHYL 4-METHYLSALICYLATE

A solution of 4-methylsalicylic acid (138 g., 0.91 mole) and 42 ml. of concentrated sulfuric acid in 600 ml. of methanol was refluxed 18 hours. About 300 ml. of the methanol was distilled away. The residual solution was diluted with water and the ester extracted with ether and distilled to give 126 g. of oily product identified as methyl 4-methylsalicylate, B.P. 130–132°/22 mm.

STEP C.—METHYL 2-BUTYRYLOXY-4-METHYL-BENZOATE

A mixture of 126.5 g. (0.76 moles) of methyl 4-methylsalicylate and 160 g. (1.5 mole) of butyryl chloride was refluxed 2.5 hours and then distilled to give 173.5 g. of methyl-2-butyryloxy-4-methylbenzoate, B.P. 173–186° C./22 mm.

STEP D.—4-METHYL-5-BUTYRYLSALICYLIC ACID

Methyl 2-butyryloxy-4-methylbenzoate (11.8 g., 0.05 mole) was added rapidly to a boiling mixture of 10.6 g. (0.08 mole) of aluminum chloride and 20 ml. of carbon disulfide. The mixture was refluxed with stirring for 6 hours. The mixture was poured onto ice and the oily product was taken up in ether. The ether was evaporated and the residual oil was hydrolyzed by being heated one-half hour on the steam bath with 50 ml. of 20% sodium hydroxide solution. The resulting solution was acidified with hydrochloric acid to precipitate 4-methyl-5-butyrylsalicylic acid, M.P. 90–120° C. Two recrystallizations from benzene gave 8.0 g. of the product, M.P. 140–144° C. An analytical sample melted at 144–146° C.

STEP E.—4-METHYL-5-(2-METHYLENEBUTYRYL) SALICYLIC ACID HYDROCHLORIDE

A mixture of 26.6 g. (0.12 mole) of 2-hydroxy-4-methyl-5-butyrylbenzoic acid, 5.4 g. (0.18 mole) of paraformaldehyde, 10.7 g. (0.13 mole) of dimethylamine hydrochloride and 1 ml. of ethanolic hydrogen chloride solution was heated 1.5 hours on the steam bath. The clear melt was treated with 200 ml. of boiling ethyl acetate to cause the Mannich salt to crystallize. There was obtained 32.5 g. of 4-methyl-5-[(2-dimethylaminomethyl)butyryl]salicylic acid hydrochloride, M.P. 133–143° C.

The 4-methyl-5-[(2-dimethylaminomethyl) butyryl]salicylic acid hydrochloride was dissolved in 125 ml. of water, and 250 ml. of a saturated solution of sodium bicarbonate was added. The mixture was heated 40 minutes on the steam bath, and then was cooled and acidified to precipitate the crude product. Two recrystallizations from benzene gave 8.0 g. of 4-methyl-5-(2-methylenebutyryl)salicylic acid, M.P. 103–105° C.

STEP F.—[2-CARBOXY-4-(2-METHYLENEBUTYRYL)-5-METHYLPHENOXY]ACETIC ACID

A solution of 23.4 g. (0.10 mole) of 4-methyl-5-(2-methylenebutyryl)salicylic acid in 200 ml. of a 0.5 N sodium hydroxide solution is stirred and maintained at 80–90° C. while there is added simultaneously a solution of 9.4 g. (0.1 mole) of chloroacetic acid in 100 ml. of 1 N sodium hydroxide solution, and 100 ml. of a 1 N sodium hydroxide solution, during 2 hours. The reaction mixture is heated an additional hour at 80° C., cooled and acidified to precipitate crude [2-carboxy-4-(2-methylenebutyryl)-5-methyl-phenoxy]acetic acid, which is purified by recrystallization from isopropyl alcohol.

STEP G.—[3-METHYL-4-(2-METHYLENEBUTYRYL) PHENOXY]ACETIC ACID

[2-carboxy-4-(2-methylenebutyryl)-5-methyl-phenoxy]acetic acid (11.7 g., 0.04 mole) is added to 40 ml. of hot diethyl succinate. The mixture is stirred and refluxed for 5 minutes until complete solution is obtained. The solution is rapidly cooled, diluted with 100 ml. of ether, and the product extracted into sodium bicarbonate solution. Acidification precipitates the product which is recrystallized from a benzene-cyclohexane mixture to yield pure [3-methyl-4-(2-methylenebutyryl) phenoxy]acetic acid, M.P. 77–79° C.

By substituting the appropriate [2-carboxy-4-(2-methylenealkanoyl)phenoxy]alkanoic acid for the [2-carboxy-4-(2-methylenebutyryl)-5-methyl-phenoxy]acetic acid reactant of Step G in Example 1 and following substantially the procedure described therein, the corresponding [4-(2-methylenealkanoyl)phenoxy]alkanoic acid compounds are prepared. The following equation depicts the said process. Table I illustrates the carboxy substituted reactants of the process and the decarboxylated products obtained thereby:

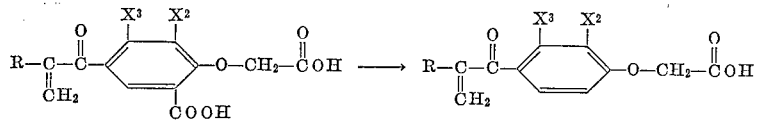

TABLE I

| Ex. | R | X² | X³ | Decarboxylating Agent | M.P. of Prod., ° C. |
|---|---|---|---|---|---|
| 2 | —C₂H₅ | H | Cl | Diethyl Succinate | 109–111 |
| 3 | —C₂H₅ | Cl | Cl | Copper Powder+Quinoline | 121–122 |
| 4 | —C₂H₅ | —H=CH—CH=CH— | | Diethyl Succinate | 106–109 |
| 5 | —C₂H₅ | Cl | CH₃ | ____do____ | 89–91 |
| 6 | —C₂H₅ | CH₃ | Cl | ____do____ | 113–114 |
| 7 | —CH₂—CF₃ | CH₃ | CH₃ | ____do____ | 82–84 |
| 8 | —CH—CH₃ <br>     \| <br>     CF₃ | H | CH₃ | ____do____ | 116–118 |
| 9 | —CH—CH₃ <br>     \| <br>     CH₃ | H | Cl | Copper Chromite+Quinoline | 122.5–123.5 |
| 10 | —CH—CH₃ <br>     \| <br>     CH₃ | Cl | Cl | ____do____ | 139–140 |

Pharmacological studies of the products of this invention demonstrate that, in many instances, they possess the unique property of causing more electrolyte to be excreted than can be caused to be excreted by known diuretics. Because of this property they are useful in therapy for the treatment of conditions resulting from an excessively high retention of electrolyte or fluid within the body, such as in the treatment of edematous conditions resulting, for example, from congestive heart failure.

We claim:

1. A process for preparing a compound of the formula:

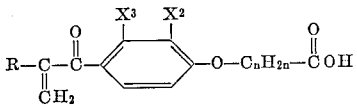

which comprises treating a compound of the formula:

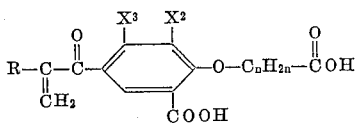

with hot diethyl succinate and boiling the mixture for a short period; wherein R is a member selected from the group consisting of lower alkyl, trihalomethyl substituted lower alkyl, cycloalkyl,

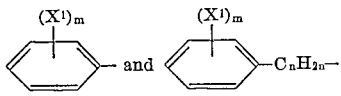

wherein $X^1$ in each occurrence, is a member selected from the group consisting of hydrogen, halogen, lower alkyl and lower alkoxy and $m$, in each occurrence, is an integer having a value of 1–4; $X^2$ and $X^3$ each represents a member selected from the group consisting of hydrogen, halogen, lower alkyl, lower alkoxy and, taken together, the $X^2$ and $X^3$ radicals are combined to form a 1,3-butadienylene linkage and $n$, in each occurrence, is an integer having a value of 1–5.

2. A process for preparing a compound of the formula:

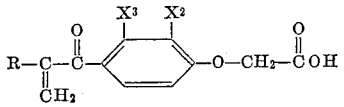

which comprises treating a compound of the formula:

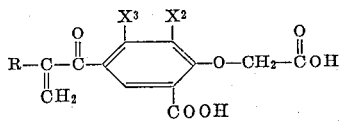

with hot diethyl succinate and boiling the mixture for a short period; wherein R is a member selected from the group consisting of lower alkyl and trihalomethyl substituted lower alkyl and $X^2$ and $X^3$ each represents a member selected from the group consisting of hydrogen, halogen, lower alkyl and, taken together, the $X^2$ and $X^3$ radicals are combined to form a 1,3-butadienylene linkage.

3. A process for preparing [3-methyl-4-(2-methylenebutyryl)phenoxy]acetic acid which comprises treating [2 - carboxy - 4 - (2 - methylenebutyryl) - 5 - methylphenoxy]acetic acid with hot diethyl succinate and boiling the mixture for a short period.

4. A process for preparing [3-chloro-4-(2-methylenebutyryl)phenoxy]acetic acid which comprises treating [2 - carboxy - 4 - (2 - methylenebutyryl) - 5 - chlorophenoxy]acetic acid with hot diethyl succinate and boiling the mixture for a short period.

5. A process for preparing [4-(2-methylenebutyryl)naphthyloxy]acetic acid which comprises treating [2-carboxy-4-(2-methylenebutyryl)naphthlyoxy]acetic acid with hot diethyl succinate and boiling the mixture for a short period.

6. A process for preparing [2-methyl-3-chloro-4-(2-methylenebutyryl)phenoxy]acetic acid which comprises treating [2 - carboxy - 4 - (2 - methylenebutyryl)-5-chloro-6-methyl-phenoxy]acetic acid with hot diethyl succinate and boiling the mixture for a short period.

7. A process for preparing [2,3-dimethyl-4-(2-methylene - 3 - trifluoromethylpropionyl)phenoxy]acetate acid which comprises treating [2-carboxy-4-(2-methylene-3-trifluoromethylpropionyl) - 5,6 - dimethylphenoxy]acetic acid with hot diethyl succinate and boiling the mixture for a short period.

References Cited by the Examiner

Royals, "Advanced Organic Chemistry" (1954), pp. 106–108.

LORRAINE A. WEINBERGER, *Primary Examiner.*

RICHARD K. JACKSON, *Examiner.*

S. B. WILLIAMS, *Assistant Examiner.*